(12) United States Patent
Fletcher et al.

(10) Patent No.: US 8,880,567 B2
(45) Date of Patent: Nov. 4, 2014

(54) DISCOVERY AND MANAGEMENT OF CONFIGURATION DATA CONTAINED WITHIN MASHUPS

(75) Inventors: James C. Fletcher, Apex, NC (US); Kimberly D. Kenna, Cary, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1957 days.

(21) Appl. No.: 11/959,448

(22) Filed: Dec. 18, 2007

(65) Prior Publication Data

US 2009/0157728 A1    Jun. 18, 2009

(51) Int. Cl.
*G06F 17/30*     (2006.01)
*G06F 7/00*      (2006.01)
*G06Q 10/10*     (2012.01)

(52) U.S. Cl.
CPC ..................... *G06Q 10/10* (2013.01)
USPC .......................................... 707/804

(58) Field of Classification Search
USPC ......................... 707/802, 803, 804
See application file for complete search history.

(56) References Cited

U.S. PATENT DOCUMENTS

| | | | |
|---|---|---|---|
| 2004/0006571 A1* | 1/2004 | Anagol-Subbarao et al. | 707/104.1 |
| 2004/0054690 A1* | 3/2004 | Hillerbrand et al. | 707/104.1 |
| 2006/0206883 A1* | 9/2006 | Sabbouh | 717/146 |
| 2007/0094256 A1* | 4/2007 | Hite et al. | 707/6 |

* cited by examiner

*Primary Examiner* — Jeffrey A Burke
(74) *Attorney, Agent, or Firm* — Steven L. Nichols; Van Cott, Bagley, Cornwall & McCarthy P.C.

(57) ABSTRACT

A computer program product for discovering and distributing relevant business information contained in a mashup comprises computer usable program code is configured to interrogate a mashup maker to discover the elements, relationships, and dependencies embodied by a mashup page; assemble this information into a data structure; and make the data structure accessible. A method for updating a configuration management database, where an end user creates a mashup page that embodies the end user's knowledge about the elements and processes required to fulfill a specific task, comprises deriving elements, relationships, and dependencies from the mashup page; creating a data structure representing this information, and communicating this data structure to the configuration management database.

21 Claims, 6 Drawing Sheets

BUILDING MAINTENANCE

ORDERS

| DATE OF ORDER | ORDER # | COST | STATUS | TRACKING# |
|---|---|---|---|---|
| FEB. 19, 2007 | BN87131 | $23.00 | SHIPPED | 1A V48 229 PQ |
| FEB. 01, 2007 | BN86472 | $20.12 | SUBMITTED | TBD |

ACCOUNTS PAYABLE

| DATE SUBMITTED | APPROVER | COST | STATUS | DESCRIPTION |
|---|---|---|---|---|
| FEB. 19, 2007 | D. SMITH | $23.00 | APPROVED | LIGHT FIXTURE |
| FEB. 01, 2007 | A. REICH | $20.12 | PENDING | SOLENOID |

SHIPPING: TRACKING DETAIL

TRACKING NUMBER: 1A V48 229 PQ
STATUS: IN TRANSIT
SHIPPED TO: DURHAM, NC, US
SHIPPED ON: 07/13/2007
WEIGHT: 3.00 LBS

PACKAGE PROGRESS

| LOCATION | DATE | LOCAL TIME | DESCRIPTION |
|---|---|---|---|
| DURHAM, NC, US | 02/20/07 | 9:49 AM | IN TRANSIT TO FINAL DESTIN. |
|  | 02/20/07 | 5:26 AM | ARRIVAL SCAN |
| DURHAM, NC, US | 02/19/07 | 6:21 PM | DEPARTURE SCAN |
|  | 02/19/07 | 1:03 PM | ORIGIN SCAN |

INVENTORY

| ITEM # | DESCRIPTION | ON HAND | ALLOCATED | ON ORDER | PRICE |
|---|---|---|---|---|---|
| GQ802 | T8 LIGHT FIXTURE | 2 | 2 | 1 | $23.00 |
| SC030 | AC SOLENOID | 5 | 1 | 1 | $20.12 |

FIG. 4

DISCOVERY AND MANAGEMENT OF CONFIGURATION DATA CONTAINED WITHIN MASHUPS

BACKGROUND OF THE INVENTION

Databases are used by businesses and other entities to store, manage, and access data. As computer systems become more capable and integrated, the focus has shifted from simply gathering and storing data to discovering the relevance and relationships between data elements. Advanced databases, such as configuration management databases, contain not only asset information, but also configuration data and, most importantly, the relationships between the assets. The configuration management databases extend database capabilities to provide fundamental answers to business or organizational issues such as reliability, efficiency, and fault awareness. For many organizations, the discovery and updating of asset and relationship information is an ongoing challenge.

BRIEF SUMMARY OF THE INVENTION

A computer program product for discovering and distributing relevant business information contained in a mashup comprises computer usable program code is configured to interrogate a mashup maker to discover the elements, relationships, and dependencies embodied by a mashup page; assemble this information into a data structure; and make the data structure accessible.

A method for updating a configuration management database, where an end user creates a mashup page that embodies the end user's knowledge about the elements and processes required to fulfill a specific task, comprises deriving elements, relationships, and dependencies from the mashup page; creating a data structure representing this information, and communicating this data structure to the configuration management database.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 4 is an illustrative diagram of one embodiment of a mashup page containing an additional view, according to principles described herein.

Throughout the drawings, identical reference numbers designate similar, but not necessarily identical, elements.

DETAILED DESCRIPTION OF THE INVENTION

Figure 1:
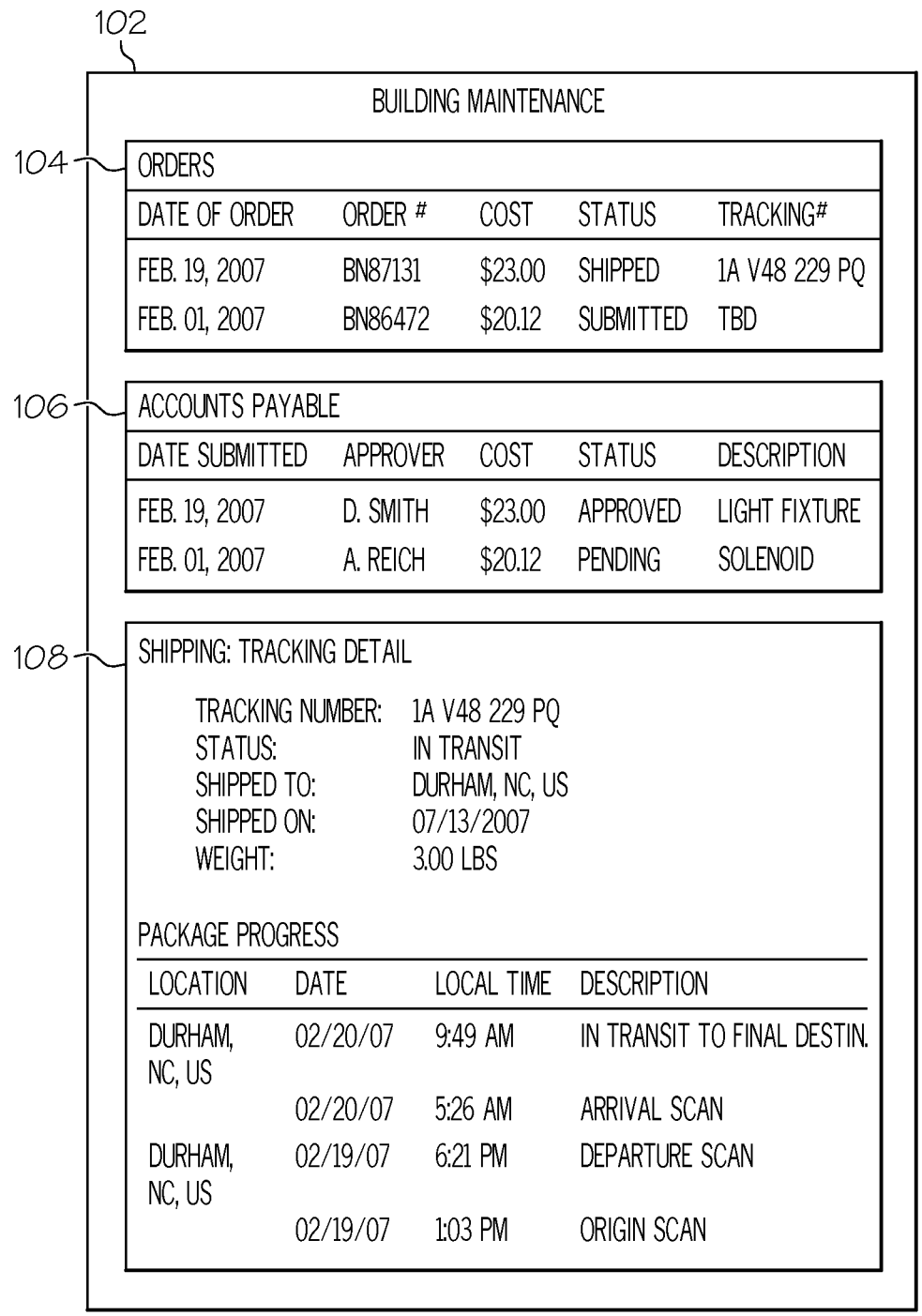
FIG. 1 is an illustrative diagram of one embodiment of a mashup page, according to principles described herein.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following description relates to an enhanced mashup maker or other means which, upon creation of a new mashup, would extract elements, relationships, and dependency information from a mashup page. This information is then contained in a data structure that represents the mashup elements, the resources needed to support the mashup elements, and other relationship data. The data structure is then accessible by external programs such as a configuration management database.

As computer systems become more capable and integrated, the focus has shifted from the simple gathering and storage of data to discovering the relevance and relationships between data elements. Software movements that embody this trend include service-oriented architecture (SOA) and configuration management databases (CMDB). For example, a traditional database may contain asset data about a particular server 'X', including the server hardware, software, and hard drive storage capacity. This traditional database may be limited to answering simple questions such as "What assets do I have?" A configuration management database can be far more capable.

A configuration management database includes asset data, configuration data, and, most importantly, the relationship between the assets. Returning to our example, a configuration management database may contain, in addition to the asset data about server 'X', information about the interconnectivity between the server 'X' and other assets, which personnel rely on the server 'X', and what functions these personnel are fulfilling as they utilized the server 'X'. The configuration management database could be used to answer questions such as "What happens to our customers if server 'X' fails?" or "What other assets must be functional for server 'X' to provide service 'Y'?"

Discovering relevant elements and updating the relationships between elements (also known as configuration items) is a fundamental task in creating and maintaining a configuration management database. The elements can be diverse and relationships between the elements can be dynamic and complex. By way of example and not limitation, relevant elements may include internal computer hardware, external computer hardware, communication channels, software applications, web pages, databases, etc. Any element that is relevant to the information system and its execution within a particular organization can be included. Discovering these relationships can be a significant challenge because many of the dependencies are not readily perceptible and/or require intimate knowledge to appreciate. There is also a need to update the relationships tracked by the configuration management database. Relationships are typically dynamic, with new relationships being continually made, old relationships terminating, and existing relationships changing in substance and significance. The ability to discover and update element/relationship information can be a primary attribute of a capable and reliable configuration management database.

One potentially rich source for discovering and updating relationships between configuration items can be found in mashups. The term "mashup" refers generally to an integration of data from one or more sources by an end-user who has primary control over the integration and presentation of that data. In principal, mashups can be done anywhere using any kind of programming language. Mashups can involve both internal and external data sources and can be web or client based.

In a very simple example, a website creates a mashup when it pulls a map from a map database on another web site or server and then adds additional data such as store or outlet location and contact information to that map for presentation to a user. In another example, a presentation mashup brings information from one or more sources together into a common user interface. Web portals, such as a MyYahoo! homepage, can be thought of as presentation mashups. The data for the features contained within a homepage mashup may come from a variety of sources such as news agencies, weather forecasters, stock exchanges, blogs, instant service providers, and other media sources. The user of a presentation mashup has broad latitude in assembling the mashup elements to accomplish a specific or general task. For example, in a web portal, the user can assemble a mashup by simply dragging and dropping pre-built widgets or choosing from among Really Simple Syndication (RSS) feeds. Additionally, as the task changes, the user of the mashup can easily adapt the elements included in the mashup and the relationship between those elements to match the task.

A defining feature of mashups is the flexibility they provide to the end user to customize the sources and presentation of data within the mashup. Businesses are becoming increasingly reliant on the use of mashup technologies as a way to resolve unique business and customer needs more quickly and dynamically. Mashups created to address a particular need or task can combine previously independent application views in new and innovative ways to fulfill those needs. These mashups have greater business value than the separate data sources or applications because they convey the interrelationships and dependencies between the constituent elements. When a mashup page is created, it becomes an embodiment of the elements, relationships, and dependencies that are required to accomplish a specific or general task. As the user's needs change or new tasks emerge, the user of the mashup may reach out to include new applications, resources, or data in the mashup. Further, the user may introduce or alter the relationships between mashup elements to adapt to a changing task. The flexibility and ease of creating a mashup allows the end user to dynamically create tools that more efficiently accomplish tasks. Mashups can embody existing business dependencies or even create new dependencies as the mashup users become reliant on the combined elements within the mashup. In many cases, the elements, relationships and dependencies are not known until the mashup page is created.

FIG. 1 is an illustrative diagram of one embodiment of a mashup (102). The mashup (102) is comprised of application views (104-108) which are relevant to the building maintenance of a particular site. The mashup (102) combines views regarding the supply orders (104) for parts and materials used in the building's maintenance, accounts payable (106) relevant to the orders (104), and shipping information (108) regarding the parts and materials for which orders have been placed. This mashup (102) enables the manager of the building to easily track the overall status of the parts and materials required for building maintenance. These applications (104, 106, 108) are technically unrelated, but have been combined to enable a user to understand the status of the various parts and materials used in the overall task of building maintenance. In the illustrated example, two of the views, i.e., orders (104) and accounts payable (106), are dependent on an application that is hosted and controlled in-house. The third view, shipping (108), is controlled by the shipping company used to send the part or material from a warehouse or supplier to the location where it is needed. As can be seen from this example, mashups combine previously independent application views in new and innovative ways to build greater business value. Mashups are excellent tools that can be used in endless applications because mashups can be dynamically created to facilitate a wide variety of tasks.

In addition to their direct utility, mashups can be mined to extract information relating to the elements, relationships, and dependencies that impact business operations. Because end users have a large amount of control when creating a mashup, a mashup can represent the end user's understanding of applications, resources, and services that are required to perform a task. Consequently, mashups can be a unique source of information regarding the elements and relationships that a business or other entity requires to function.

In addition to elements and relationships that are apparent in the display of the application views, the resources that support these applications views are important. The business function fulfilled by the mashup page is dependent on the software, servers, and communication networks that create and support the application views. For example, in FIG. 1 each view (104-108) of the mashup (102) can be seen as an operational element within the environment of building maintenance. On an even larger scale, the continued or successful operation of a business enterprise may depend on this task of building maintenance. The mashup (102) depends on various applications which support each view (104-106). The applications, in turn, are dependent on the hosting servers and communication networks to transmit the application data.

Figure 2:
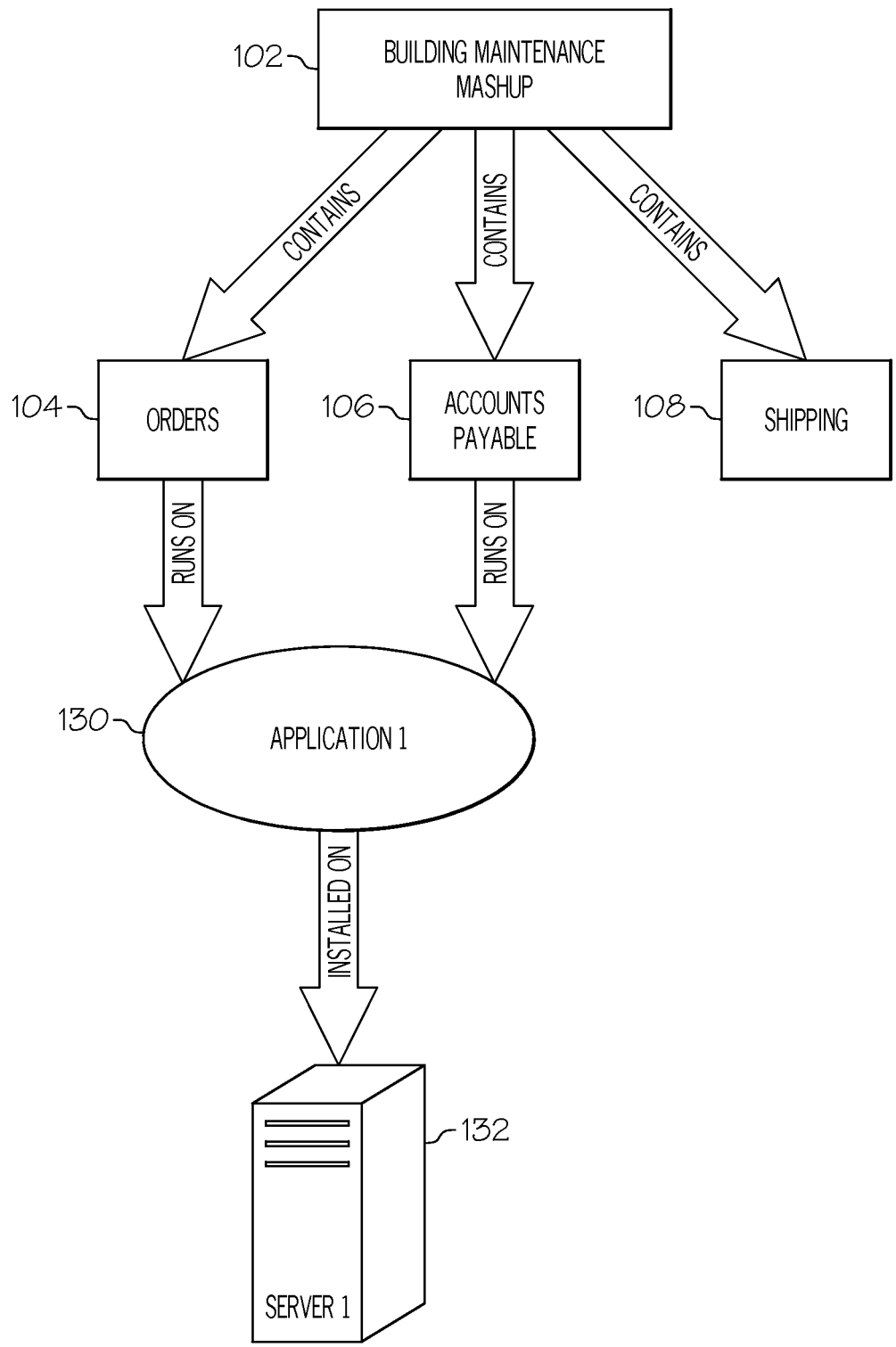
FIG. 2 is an illustrative diagram showing dependencies of application views in an exemplary mashup page, according to principles described herein.

FIG. 2 is an illustrative diagram showing relationships between elements associated with the mashup (102). As described above, the mashup (102) depends on three views (104-108) for proper operation. In addition, each view depends on an underlying application. In the illustrated example, the supply order view (104) and accounts payable view (106) are dependent on a first application (130) hosted on a server (132). By way of example and not limitation, the first application (130) may be a server-based software application hosted on a WebSphere Application Server (WAS) (132). Consequently, in FIG. 2, views (104) and (106) are shown as dependent on the underlying application (130) and server (132).

In contrast, the shipping view (108) lacks illustrated application dependency information because it is a third party data source. Other elements and relationships could be added to the diagram to address this. For example, a third-party server or application supporting the shipping view (108) could be shown. Additionally, by way of example and not limitation, if the shipping view (108), including tracking detail, was obtained using the Internet to access the shipper's website, the shipping view (108) is dependent both on the shippers website to supply the data and the Internet to convey the data to the mashup page. Knowledge of dependency on third parties, outside communication networks, and websites is valuable even though the business does not have direct control over these elements. For example, contingency plans could be made to minimize the impact on business from the failure of such third party resources.

A business or other entity that has created and uses the mashup in FIG. 1, would therefore be dependent on each element (102-132) shown in FIG. 2, both to support the mashup (102) and the task that the mashup supports, in this example, building maintenance. Currently there are very few tools to understand the dependencies and relationship that mashups embody and rely on, as well as the impact of these elements on the overall user task that the mashup may support. It can be difficult, for example, to determining the impact that the failure of a given resource will have on the entity's productivity. Consequently, the present specification describes a mechanism, such as an enhanced mashup maker, for dynamically tracking elements and relationships embodied in mashups. This information can also then inform as to the impact of various elements on the overall or real-world task that the mashup supports.

Mashup makers are assembly environments used to combine various data sources to create the desired mashup. The mashup maker has knowledge of available resources, how to access those resources, and how the resources can be, or are to be, combined. For example, a mashup maker may allow users to fit together pre-built blocks (also known as widgets) in order to mash together different web services and visualization tools. For example, a user could snap together photo and map blocks to produce a geotagged map of pictures. Advanced tools may also allow users to modify the code that makes up the modules. When the creation of a mashup page is complete, the mashup maker exports the mashup code, which contains instructions for accessing and displaying the various views that comprise the mashup page. According to one exemplary embodiment, a discovery module is added to the mashup maker configured to create a data structure that corresponds to each mashup page and provides an interface for communicating this data structure to external programs. The data structure represents the elements and relationships embodied on the mashup page.

Figure 3:
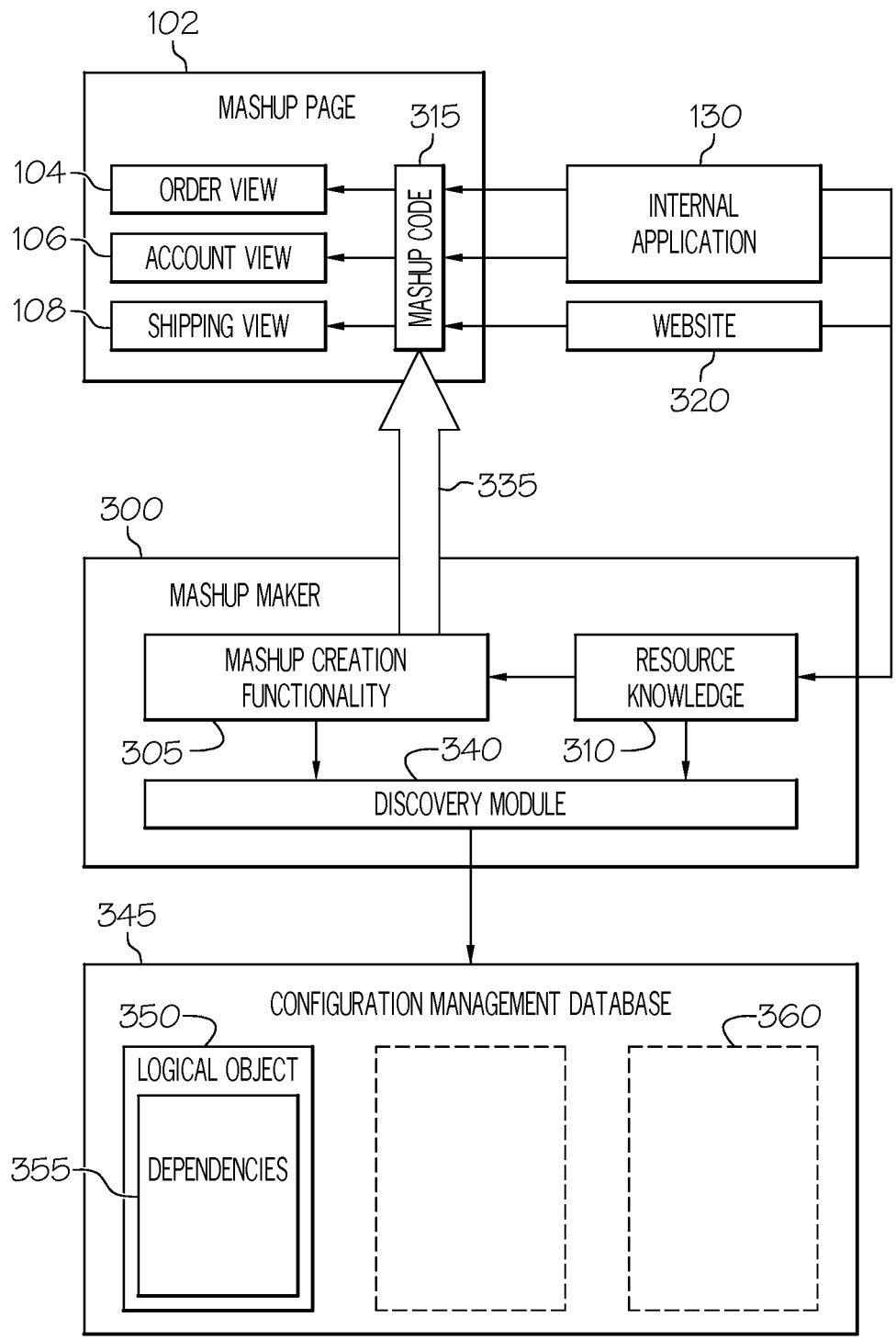
FIG. 3 is an illustrative diagram describing one exemplary embodiment of a system for creating and extracting information from a mashup, according to principles described herein.

FIG. 3 is an illustrative diagram showing a mashup maker (300) containing mashup creation functionality (305) and a knowledge of available resources (310). The mashup creation functionality (305) may comprise a plurality of pre-built blocks that can be selected and assembled by a user, including page layout capability and other higher functionalities. The knowledge of available resources (310) may comprise a database of internal or external addresses, domain names, websites, RSS feeds, and other sources of data that can integrated into a mashup page. The mashup user can utilize the mashup maker (300) to define a mashup page (102) by assembling pre-built blocks, linking existing sources of data to the pre-build blocks, requesting new sources of data, altering code within the pre-built blocks, creating new blocks, laying out the mashup page, or other actions. The mashup maker (300) then exports the mashup code (315) as shown by the arrow (335).

According to this exemplary embodiment, the mashup page comprises an order view (104), an account view (106), and a shipping view (108). The mashup code (315) contains the information to access the internal application (130) that provides the data for the order view (104) and the account view (106) as well as the external website (320) that provides the shipping view (108). The mashup code could also interpret the received information and format the data to create the relevant views (104, 106, 108) as designed by the mashup page user.

The mashup maker (300) also contains a discovery module (340). The discovery module (340) uses the mashup creation functionality (305), the mashup code (315), and the knowledge of resources (310) to create a data structure that represents the elements within the mashup page (102) and the known dependencies and relationships between those elements. As used in this specification and appended claims, the term "data structure" generically refers to any organized data set. Modifiers are used to further define and limit the term "data structure" as indicated throughout the specification.

A variety of discovery methods could be used by the discovery module (340). For example, the discovery module (340) could examine the mashup code (315) to ascertain who the user of the mashup page (102) is, what task is being fulfilled by the mashup page (102), and what elements are being displayed. Additionally, by examining the mashup code (315) or querying the knowledge of resources (310), the discovery module (340) could determine the data sources of the views (104, 106, 108) contained in the mashup page (102). For example, if the discovery module (340) determined that the shipping view (108) pointed to a website (320) for its data, the discovery module (340) could log the Internet and/or the website (320) as additional elements and create the appropriate dependency between the shipping view (108), the Internet, and the website (320). For the order view (104) and account view (106), the discovery module (340) could similarly associate the internal application (130) and the server that hosts the internal application (130) as dependencies within the data structure.

The discovery module (340) could be contained within the mashup maker (300) as shown in FIG. 3, within the configuration management database (345), or as an independent discovery tool. Additionally, the mashup maker (300) or configuration management database (345) could use other contextual methods for determining relationship data. For example, the position of the views on the page could be used to extract relevant information about the importance of, the work flow of, or other information regarding the task being performed.

According to one exemplary embodiment, whenever the mashup maker (300) is used to create a new mashup (102), the mashup maker (300) also creates a new corresponding data structure for that mashup using the discovery module (340). The discovery module (340) has an exposed interface through which the configuration management database (345) can access and download the data structure. Possible mechanisms for communicating between the discovery module (340) and the configuration management database (345) include the creation of an extensible markup language (XML) file, an extensible hypertext markup language (XTML), making the data available via a web service, publish/subscribe model, or any other suitable mechanism. The downloaded data, including identified dependencies (355), is then incorporated into a logical object (350) that joins other logical objects (360), libraries, and database elements within the configuration management database (345). The configuration management data base (345) could then correlate the mashup supplied data with data extracted using other discovery mechanisms, thereby building a more complete and robust knowledge of the tracked business operations and functions. For example, a software tool could track the number of users that regularly view and interact with a mashup page and generate a hit count. This data could be used to indicate the relative importance of the mashup page and to prioritize incidents that may impact the resources on which the mashup page is dependent.

According to one exemplary embodiment, the mashup maker could be further comprised of code enabling it to export a discovery library to other applications such as a configuration management database hosted on a WebSphere Application Server (WAS). In general, a library is a partitioned data set or collection of model elements that groups related objects. A discovery library is a file system directory which stores discovery library books, which contain XML-based representations of data from management software systems sources. The discovery library could be populated by discovery library adapters which access data from the mashup maker, convert the data into an XML-based language (e.g. IDML), and store the data in books in the discovery library. The configuration management database could then access or download the discovery library and read the data using a discovery library reader. A discovery library reader is any program that reads configuration item data from XML-based books in the discovery library and converts this data into the format that is required by a variety of consuming applications, such as a configuration management database. The configuration management database then assimilates the data formatted by the discovery library reader into its database.

During the life of a mashup, a variety of alterations could be made to the mashup. These changes could be motivated, for example, as a result of a change in the task the mashup was designed to fulfill, a change in the availability of supporting data, or other circumstances. In order to maintain a current and reliable view of the configuration items and their dependencies, it can be advantageous to update the configuration management database whenever changes are made to a mashup. FIG. 4 is an illustrative diagram of a mashup page (102) which has been updated to include an inventory view (400). The addition of a new view to the mashup (102) presents an additional element, relationships, and dependencies that could be valuable to track within a configuration management database.

Figure 5:
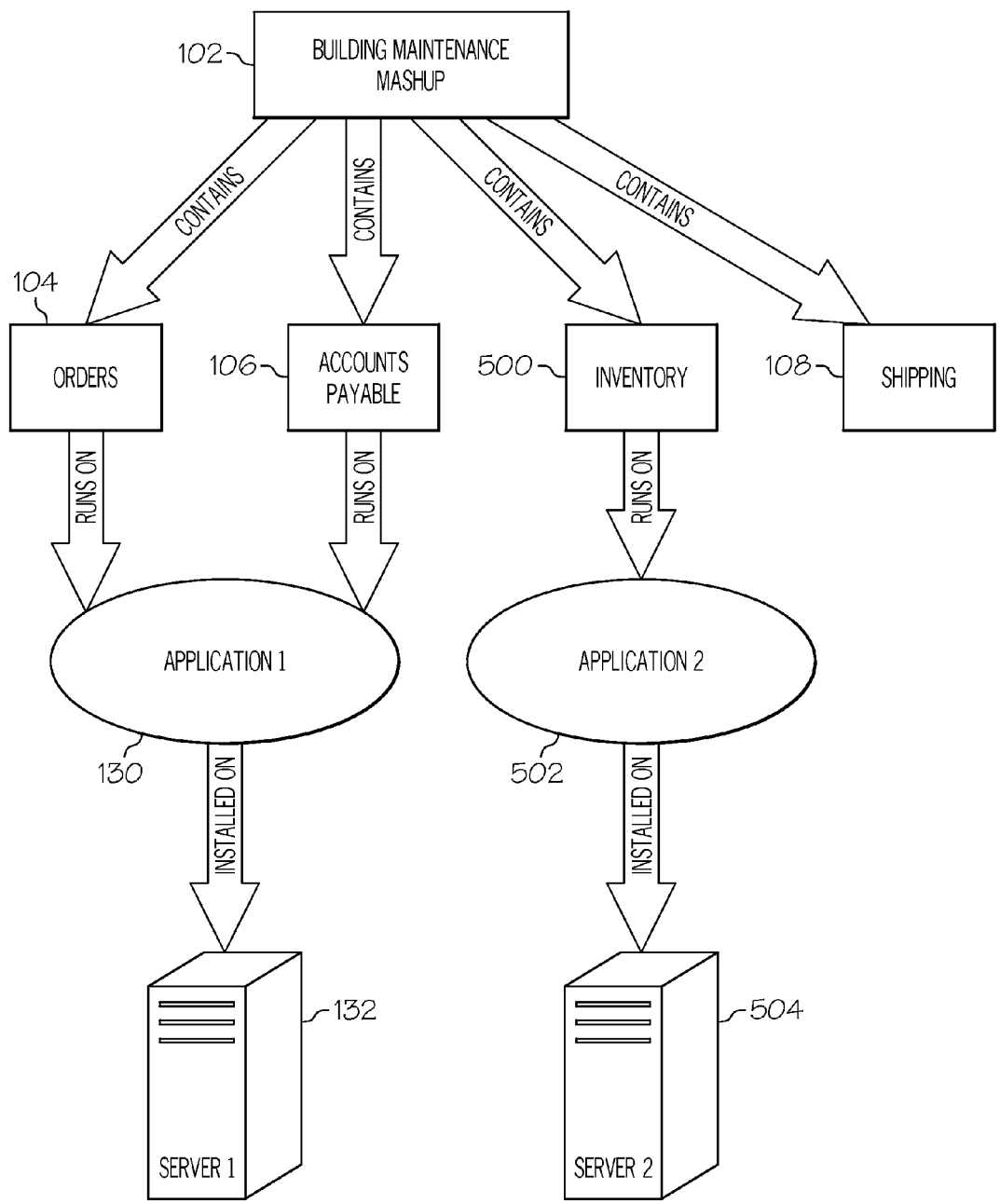
FIG. 5 is an illustrative diagram showing updated dependence relationships between elements in an exemplary mashup page, according to principles described herein.

FIG. 5 is an illustrative diagram that shows the updated elements and dependencies. As shown in FIG. 5, the inventory view (500) is dependent on a different application (502) than are the order view (104) and the account view (106). The second application (502) is hosted on a second server (504). To keep a complete view of the information embodied by the building maintenance mashup (102) these additional elements and relationships need to be identified and integrated into the corresponding data structure within the configuration management database.

According to one exemplary embodiment, the discovery module creates a new data structure each time the mashup page is updated. This new data structure can be conveyed via an exposed interface to external applications such as the configuration management database.

In another exemplary embodiment, the mashup would have a separate updating service which could be accessed to obtain information representing the changes made to the mashup. The updating service could then be accessed by external programs which would retrieve the data and update their respective databases.

According to a third exemplary embodiment, the mashup maker could make the appropriate changes to the discovery library, which could then be accessed, formatted by the discovery library reader, and then integrated into the relevant database.

According to a fourth exemplary embodiment, the configuration management database could use a discovery-by-event mechanism to update its database. A discovery-by-event mechanism is a type of autodiscovery in which either (1) a program receives a notification of special events that provides the name and location of a particular resource or (2) a program receives normal events and recognizes that no object or dependency represents the resource that originated the events, creates an object for that resource, and posts events to that object. For example, the configuration management database could receive an update event notification of a mashup page change and the location of the mashup maker containing the updated information. The configuration management database then accesses the appropriate mashup maker, downloads the updated information and makes appropriate changes to the logical object representing the mashup page. Another discovery by event mechanism could include the mashup maker sending the new element and dependency data that resulted from the mashup update to the configuration management database. The configuration management database then recognizes that the new elements and dependencies are not contained within the logical object that represents the designated mashup page. The configuration management database then updates the logical object with the appropriate data.

Figure 6:
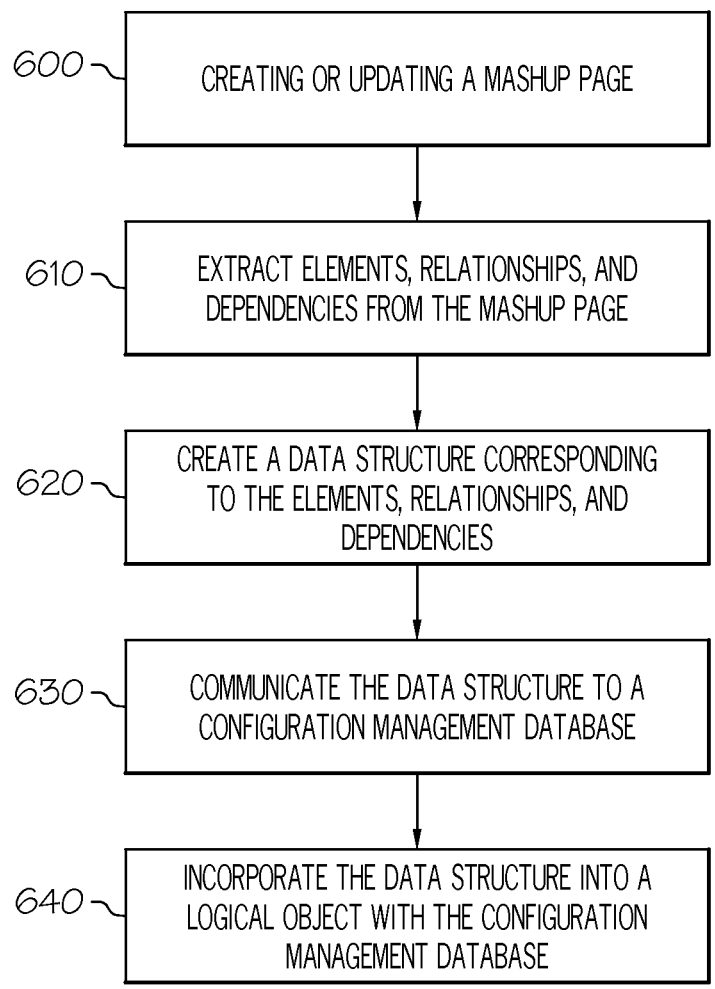
FIG. 6 is a flow chart illustrating one exemplary method for extracting and utilizing information contained in a mashup page, according to principles described herein.

FIG. 6 is a flow chart showing one exemplary method for extracting and utilizing information contained in a mashup page to update a configuration management database. When an end user creates or updates a mashup page (step 600), the end user's knowledge about the elements and processes required to fulfill a specific task are embodied in the mashup page. These elements, relationships, and dependencies can be extracted from the mashup page (step 610) to provide greater understanding of the fundamental factors that affect an organization or entity. A data structure can then be created to represent the extracted information (step 620).

This data structure can take a variety of forms including, but not limited to, a logical object, a discovery library, XML data, a database component, or other form. The data structure is communicated to external programs (step 630). By way of example and not limitation, the external program could be a configuration management database. According to one exemplary embodiment, the data structure is a then incorporated by the configuration management database into a logical object (step 640).

Consequently, the present specification has described using a mashup maker as a discovery tool to extract previously undiscoverable resources and relationships from mashups as they are created or updated. Discovery, access, and management of the resources and relationships upon which organizations rely is important for creating better business strategy, efficiency, and agility. Mashup pages are an underutilized source of information about these resources and relationships. Previously unapparent or undiscoverable relationships become apparent when application views supported by resources and communication channels are loosely tied together on a mashup page. By extracting elements, relationships, and dependencies from mashups, organizations can gain a greater understanding the resources and relationships upon which they depend.

A mashup maker is an application which allows end users to create mashup pages. Through the process of creating or updating a mashup page, the mashup maker has knowledge of the elements that make up the mashup page and the resources upon which these elements depend. As a mashup is created or updated, the mashup maker is configured to create or update a data structure corresponding to and cataloging the elements and consequent dependencies embodied within the mashup page. The mashup maker then makes this data structure available to a configuration management database or other applications.

When this data structure is fed into the configuration management database, it can be correlated with other discovery mechanisms, creating a more comprehensive and reliable understanding of the resources and relationships the organization depends on. Additionally, the initially exported data structure representing the mashup page and the resources and relationships that support it can be expanded to include an indication of relationships where two or more components of the mashup page have been linked or wired together to send context data to one another. These relationships indicate an even deeper mutual dependence among the related components for completion of the task than does simply appearing on the same mashup page.

Additionally, when a mashup page or structure is deleted, the deletion may be reflected in periodic updates to the configuration management database. For example, deletion of a mashup page will result in deletion of the corresponding elements representing that mashup page from the configuration management database, including the elements on the page and their relationships to one another previously recorded in the configuration management database.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product for discovering and distributing relevant business information contained in a mashup, the computer program product comprising:
   a computer usable storage medium having computer usable program code embodied therewith, the computer usable program code comprising:
   computer usable program code configured to interrogate a mashup maker to discover the elements, relationships, and dependencies embodied by a mashup page;
   computer usable program code configured to assemble information representing said elements, relationships, and dependencies to a data structure, and
   computer usable program code configured to make said data structure accessible to other entities.

2. The computer program product of claim 1, wherein said computer useable program code configured to interrogate said mashup maker is a discovery module within said mashup maker.

3. The computer program product of claim 2, wherein said mashup maker is configured to create a mashup page by generating mashup code, said mashup code comprising data source locations and formatting commands.

4. The computer program product of claim 3, wherein said discovery module analyzes said mashup code to discover said elements, relationships, and dependences.

5. The computer program product of claim 4, wherein said discovery module is further configured to analyze said data source locations to discover applications, resources, or networks that support said data source.

6. The computer program product of claim 2, wherein said discovery module is further configured to interrogate said data sources within said mashup maker to discover said elements, relationships, and dependencies.

7. The computer program product of claim 3, wherein said data structure is made available to other entities via at least one of an extensible markup language, derivatives thereof, a Web service, and a publish/subscribe model.

8. The computer program product of claim 2, wherein said computer usable program code is configured make said data structure accessible to a configuration management database.

9. The computer program product of claim 8, wherein said data structure comprises a logical object, said logical object representing said elements and said dependencies of said mashup page.

10. The computer program product of claim 9, wherein said data structure is made available to other entities as a discovery library.

11. The computer program product of claim 10, wherein said discovery module provides updates to said configuration management database by creating a new logical object.

12. The computer program product of claim 11, wherein said configuration management database uses an autodiscovery method for updating said configuration management database.

13. A method for updating a configuration management database comprising:
   extracting elements, relationships, and dependencies from a mashup page, wherein said mashup page embodies knowledge about elements and processes required to fulfill a specific task;
   creating a data structure representing said elements, relationships, and dependencies embodied in said mashup page; and
   communicating said data structure to said configuration management database.

14. The method of claim 13, further comprising updating said configuration management database when said mashup page is revised.

15. The method of claim 14, wherein said data structure is at least one of a logical object and a discovery library.

16. The method of claim 15, wherein said communicating said data structure to said configuration management database comprises an exposed interface making said data structure available via at least one of an extensible markup language, derivatives of extensible markup language, a Web service, and a publish/subscribe model.

17. The method of claim 14, wherein said updating said configuration management database comprises communicating a new logical object to said configuration management database or updating said discovery library.

18. The method of claim 14, wherein updating said configuration management database comprises autodiscovery mechanisms within said configuration management database.

19. The method of claim 14, wherein said extracting said dependencies comprises analyzing said mashup page elements to determine which resources are required to support said mashup page elements.

20. The method of claim 19, wherein said resources required to support said mashup page elements comprise at least one of applications, servers, and communication networks.

21. A system for providing information regarding system dependencies, said system comprising:
   a computer for executing a mashup maker for producing mashups; and
   a configuration management database in communication with said computer;
   wherein a said mashup embodies a user's knowledge about elements and processes required to fulfill a specific task;
   wherein said mashup maker is configured to extract elements, relationships, and dependencies from said mashup page and create a data structure representing said elements, relationships, and dependencies embodied in said mashup page; and
   wherein said data structure is communicated to said configuration management database.

* * * * *